United States Patent
Jäger et al.

(10) Patent No.: US 9,896,274 B2
(45) Date of Patent: Feb. 20, 2018

(54) SUPPORT ROLLER OR DRIVE ROLLER FOR A DRIVE BELT OF A CONVEYOR

(71) Applicant: Arnold Jäger Holding GmbH, Hannover (DE)

(72) Inventors: Sebastian Jäger, Hannover (DE); Nick Schmidt, Lehrte (DE)

(73) Assignee: Arnold Jäger Holding GmbH, Hannover (DE)

(*) Notice: Subject to any disclaimer, the term of this patent is extended or adjusted under 35 U.S.C. 154(b) by 0 days.

(21) Appl. No.: 14/676,632

(22) Filed: Apr. 1, 2015

(65) Prior Publication Data

US 2015/0274432 A1    Oct. 1, 2015

(30) Foreign Application Priority Data

Apr. 1, 2014    (EP) .................................... 14163052

(51) Int. Cl.
  *B65G 39/02*    (2006.01)
  *B65G 39/09*    (2006.01)

(52) U.S. Cl.
  CPC ............. *B65G 39/02* (2013.01); *B65G 39/09* (2013.01)

(58) Field of Classification Search
  CPC ...... F16C 13/006; F16C 13/022; B65G 39/02; B65G 39/09
  USPC .................................. 492/16, 40, 48, 53, 56
  See application file for complete search history.

(56) References Cited

U.S. PATENT DOCUMENTS

| | | | | |
|---|---|---|---|---|
| 1,353,874 A | * | 9/1920 | Wego | B65G 39/09 384/505 |
| 1,503,920 A | * | 8/1924 | Schneebeli | F16C 13/022 101/348 |
| 2,012,256 A | * | 8/1935 | Boudreau | F16C 33/78 277/563 |
| 2,886,156 A | * | 5/1959 | Halbron | B65G 39/02 193/37 |
| 3,648,824 A | * | 3/1972 | Speck | B65G 39/09 198/501 |
| 3,711,912 A | * | 1/1973 | Teske | B29D 99/0035 198/835 |
| 3,793,689 A | * | 2/1974 | Specth | B65G 39/02 193/37 |
| 3,803,682 A | * | 4/1974 | Stein | B65G 13/073 198/791 |
| 5,099,559 A | * | 3/1992 | McGrath | B65G 39/09 29/898.07 |

(Continued)

FOREIGN PATENT DOCUMENTS

DE        860023    12/1952
DE        8024757 U1    3/1981

(Continued)

*Primary Examiner* — Jason L Vaughan
(74) *Attorney, Agent, or Firm* — Shlesinger, Arkwright & Garvey LLP

(57) ABSTRACT

A support roller or drive roller for a drive belt of a conveyor, having a hub which is supported by use of ball bearings and which is provided with an elastic polymer layer on its outer periphery as a running surface for the drive belt. The roller is easily manufactured as the hub is made up of a hollow cylindrical outer hub which bears the polymer layer, and a hollow cylindrical inner hub which accommodates the ball bearings. Further, the inner hub is pushed into the outer hub and joined to the outer hub in a rotationally fixed manner.

9 Claims, 3 Drawing Sheets

(56) References Cited

U.S. PATENT DOCUMENTS

| | | | | |
|---|---|---|---|---|
| 5,381,887 A * | 1/1995 | Emmons | ............... | B65G 39/02 |
| | | | | 193/37 |
| 7,549,524 B2 * | 6/2009 | Eichhorn | ............... | B65G 39/06 |
| | | | | 193/37 |
| 7,661,519 B2 * | 2/2010 | Hong | ............... | B65G 39/02 |
| | | | | 193/37 |
| 8,505,706 B2 * | 8/2013 | Horling | ............... | B65G 39/09 |
| | | | | 193/37 |
| 8,646,984 B2 * | 2/2014 | Gagnon | ............... | B65G 39/09 |
| | | | | 184/18 |
| 2007/0261933 A1 * | 11/2007 | Scott | ............... | F16C 13/022 |
| | | | | 193/37 |
| 2009/0169146 A1 * | 7/2009 | Gagnon | ............... | B65G 39/09 |
| | | | | 384/462 |
| 2012/0045156 A1 * | 2/2012 | Pickel | ............... | B65G 39/09 |
| | | | | 384/489 |

FOREIGN PATENT DOCUMENTS

| | | |
|---|---|---|
| DE | 20212872 U1 | 2/2003 |
| DE | 202005004566 U1 | 6/2005 |
| EP | 2927165 B1 | 10/2015 |
| WO | WO9806649 A1 | 2/1998 |

* cited by examiner

SUPPORT ROLLER OR DRIVE ROLLER FOR A DRIVE BELT OF A CONVEYOR

CROSS-REFERENCE TO RELATED APPLICATIONS

This application claims the priority of European Patent Application No. EP 14163052.5, filed Apr. 1, 2014, and which is incorporated herein by reference.

FIELD OF THE INVENTION

The present invention relates to a support roller or drive roller for a drive belt of a conveyor according to the preamble of Claim 1.

BACKGROUND OF THE INVENTION

Rollers of this type are used to support or drive a drive belt on its continuous circulation path.

A known support roller is described in DE 80 24 757 U1. This roller has a hub which by means of two ball bearings is rotatably supported on a bearing journal, which in turn is connected to a machine in which the conveyor having the drive belt is used. The hub is designed as a plastic molded body made of polyamide, and is therefore very dimensionally accurate. The hub may thus be used directly for a rotationally fixed connection to the outer rings of the ball bearings. On its outer periphery, the hub is equipped with a jacket made of rubber which is used as the running surface for the drive belt.

This roller described in DE 80 24 757 U1 rolls very smoothly and has low inertia. However, one disadvantage is that this roller is relatively heavy due to the great wall thickness of the hub.

Rollers are described in WO 98/06649 A1 and DE 202 12 872 U1 which have a roller cylinder, a one-piece hub which accommodates the roller bearings being inserted in a rotationally fixed manner into each end of the roller cylinder.

A generic roller is described in DE 20 2005 004 566 U1. This roller has a bearing core in the form of a hollow cylindrical inner hub which accommodates the ball bearings, and has a running body in the form of a hollow cylindrical outer hub which bears a polymer layer as the running surface, the bearing core being inserted into the running body and being joined to same in a rotationally fixed manner.

OBJECTS AND SUMMARY OF THE INVENTION

The object of the present invention is to provide a generic support roller or drive roller which is easily manufactured and which has a thin-walled hub and a dust-tight seal.

This object is achieved according to the invention using a roller having the features of Claim 1.

A support roller or drive roller according to the invention has a hub which is divided into two parts, namely, an inner hub and an outer hub. This two-part division makes it possible to manufacture the outer hub having the running surface separately from the inner hub, and to subsequently combine both parts to form a complete hub. This results in numerous advantages.

The hub is subjected to heavy mechanical load due to shrinkage forces during the process of applying the running surface. These forces may be eliminated by inserting a fitting cylindrical die, which absorbs the shrinkage forces, into the separately manufactured hollow cylindrical outer hub. Thus, the separately manufactured inner hub is not affected by the shrinkage forces, so that its geometry (bearing seats, etc.) as manufactured remains dimensionally accurate. For a one-part hub, the geometry of the hub would be impaired if it did not have a particularly robust design, which could make bearing installation, for example, difficult if not impossible (rejects).

Advantages result when the present invention is used, even for robust, heavy hubs made of metal, whose dimensional accuracy is not impaired by the shrinkage forces which act during application of the polymer layer. When the hub is divided into a thin-walled, and thus light, outer hub and a heavy inner hub, for applying the polymer layer, it is necessary to insert only the outer hub into the mold and heat it. This requires less energy than when a heavy one-part hub must be heated. This also has ergonomic benefits, since the heavy hub does not have to be handled. Logistical advantages result from a possible separation of the manufacture of the polymeric running surface and installation of the roller, since transport routes of the heavy metal parts, for example cast parts, may be dispensed with.

Since one of the end faces of the outer hub is partially closed by an end wall in which only a central circular passage opening is provided, the dust-tightness of the roller is improved.

In one advantageous embodiment of the invention, the dust-tightness of the roller is further increased when the polymer layer situated on the outer side of the jacket of the outer hub is drawn radially inwardly in a continuation on the outer side of the end wall, and ends in a circular sealing lip.

Further advantageous embodiments of the roller result from the other dependent claims.

The invention is explained in greater detail below with reference to one embodiment. The associated drawings show the following:

DETAILED DESCRIPTION OF THE INVENTION

Figure 1:
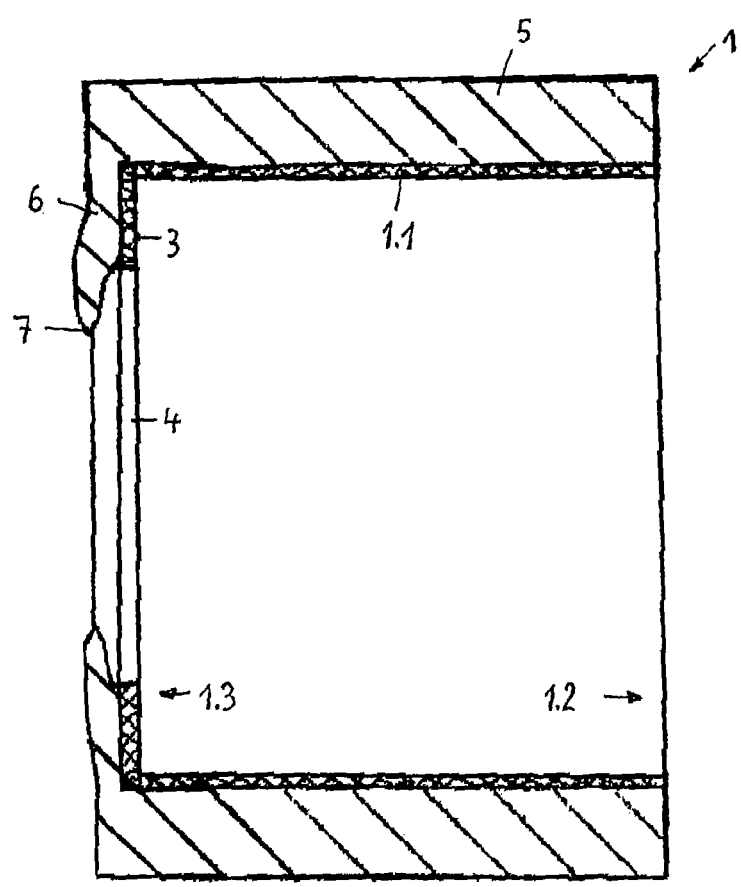
FIG. 1 shows a cross section of an outer hub of a support roller or drive roller.

The outer hub 1 shown in FIG. 1, as an injection-molded part made of polyamide, is designed as a hollow cylinder having a jacket 1.1 and two end faces 1.2 and 1.3. One of the end faces 1.2 of the outer hub 1 is completely open, while the other end face 1.3 is partially closed by an end wall 3 which is formed in one piece with the jacket 1.1, and in which a circular central passage opening 4 is provided. For completion, the outer hub 1 is inserted into an injection mold, in which an elastic polymer layer, for example a rubber layer 5, as the running surface is molded onto the outer side of the jacket 1.1 and is drawn radially inwardly in a continuation 6 on the outer side of the end wall 3, and ends in a circular sealing lip 7 whose inside diameter on the inner side terminates flush with the passage opening 4, and from there diverges outwardly, and ultimately ends with an inside diameter which is smaller than the inside diameter of the passage opening 4.

Figure 2:
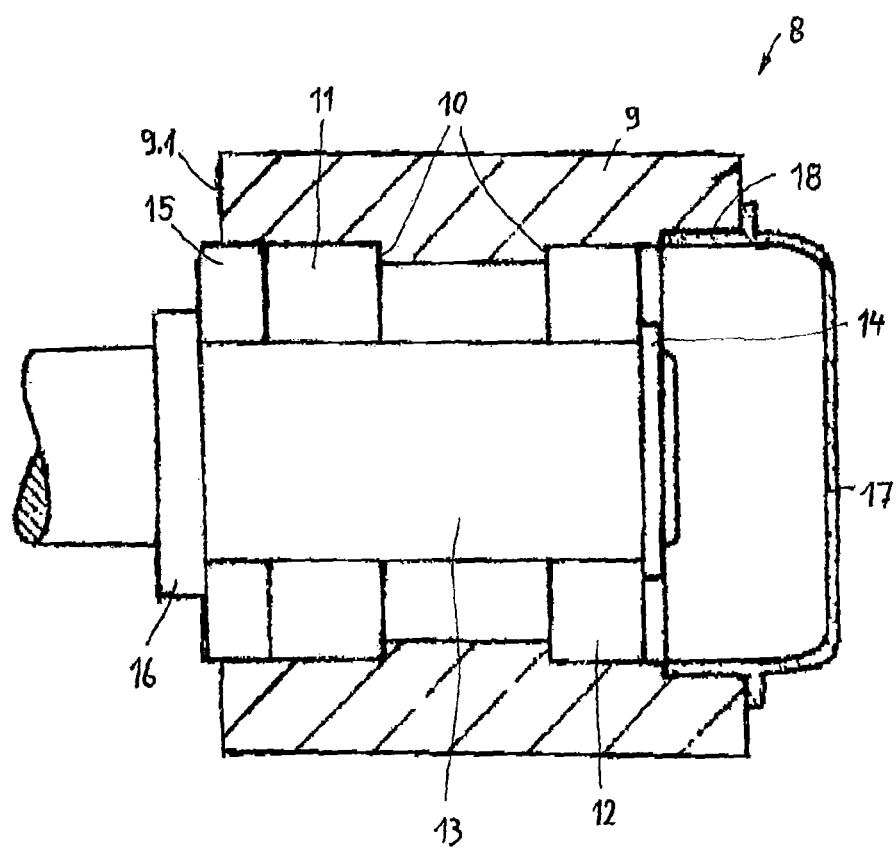
FIG. 2 shows a cross section of an inner hub of the roller together with preinstalled ball bearings.

The inner hub 8 shown in FIG. 2 is likewise manufactured as an injection-molded part made of polyamide. The inner hub has a hollow cylindrical jacket 9 whose wall thickness is much greater than that of the jacket 1.1 of the outer hub 1. The inner hub 8 is stepped on its inner side, thus forming two shoulders 10. These shoulders 10 form stops for the outer rings of ball bearings 11 and 12, which are only schematically illustrated. During preassembly of the roller 2, the ball bearing 11 is pushed in from the left, based on the illustration in the figure, into the inner hub 8 with a press fit until the outer ring of the ball bearing 11 rests against its associated shoulder 10 of the inner hub 8. The ball bearing 12 is similarly pushed in from the right into the inner hub 8 until it stops against its associated shoulder 10.

In another embodiment not illustrated, the inner hub 8 is designed as a hollow body, not as a solid body. For this purpose, it has a hollow cylindrical outer jacket and a hollow cylindrical inner jacket, the outer and inner jackets being braced against one another by radial webs distributed on the circumference. The shoulders 10 for the ball bearings 11 and 12 are then formed on the inner jacket of the inner hub. An inner hub 8 having this type of design is very lightweight, yet stable.

After both ball bearings 11 and 12 are installed, based on the illustration in the figure, a bearing journal 13 is inserted into the inner hub 8 and passes through the ball bearings 11 and 12. The journal 13 protrudes beyond the inner ring of the ball bearing 12, and at that location is secured by a snap ring 14 to prevent it from being pulled back. A press-on ring 15 which is held in contact with the ball bearing 11 by a shoulder 16 that is formed in one piece with the journal 13 is situated on the outer side of the ball bearing 11. On the other side of the inner hub 8, a dust cap 17 is pushed into the jacket 9 in order to achieve a dust-tight closure at that location. For this purpose, a corresponding recess 18 is provided on the inner side of the jacket 9. The dust cap 17 is inserted with pretensioning to ensure a secure hold of the dust cap 17 to the inner hub 8.

Figure 3:
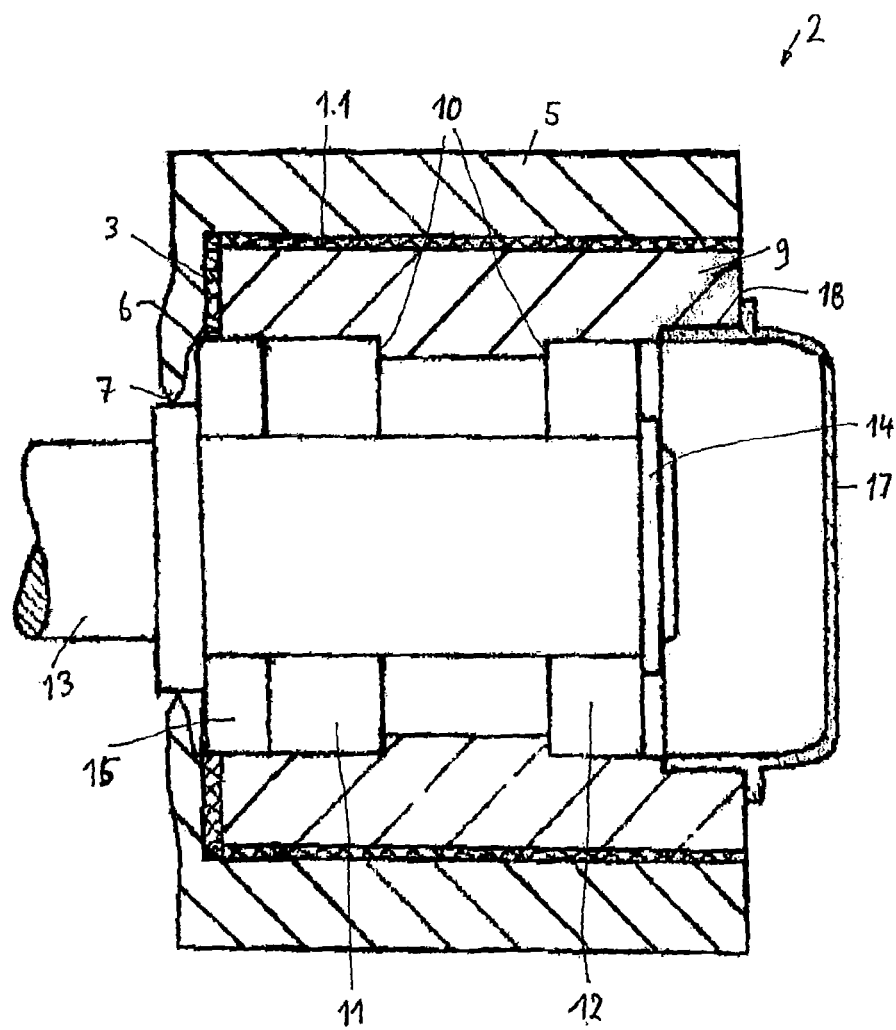
FIG. 3 shows a completely assembled roller.

For final assembly of the roller 2, the inner hub 8, which is preassembled in this way, is pushed in from the left, based on the illustration in the figure, into the outer hub 1 until the end wall 3 rests against an end wall 9.1 of the jacket 9 of the inner hub 8. When the inner hub 8 is inserted into the outer hub 9, the sealing lip 7 ultimately comes to rest against the shoulder 16, as illustrated in FIG. 3. A dust-tight seal of the roller 2 is thus ensured on this side.

A rotationally fixed connection between the outer hub 1 and the inner hub 8 is established by adhesive bonding. For this purpose, a suitable adhesive is applied to the outer side of the jacket 9 of the inner hub 8 before the inner hub 8 is inserted into the outer hub 1.

Instead of an integral bond, the rotationally fixed connection between the outer hub 1 and the inner hub 8 may be established by a positive fit or by shrinking the outer hub onto the inner hub.

The bearing journal 13 is used for fastening the roller 2 to a machine in which a conveyor having a drive belt is used. In a departure from the above installation sequence, the bearing journal 13 may of course also be inserted into the roller 2 only after the outer hub 1 and the inner hub 8 have been joined together. This also applies for the dust cap 17.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A support roller or drive roller for a drive belt of a conveyor, comprising:
   a) a hub being supported by ball bearings and being provided with an elastic polymer layer on its outer periphery as a running surface for the drive belt, and the elastic polymer layer having an end wall extending radially inwardly and in which a circular central passage opening is provided;
   b) the hub including a hollow cylindrical outer hub which bears the polymer layer, and a hollow cylindrical inner hub which accommodates the ball bearings, and the inner hub being in the outer hub and joined to the outer hub in a rotationally fixed manner; and
   c) the outer hub having a jacket having two end faces, and one of the two end faces being partially closed by an end wall of the jacket, and in which a circular central passage opening is provided.

2. The support or drive roller according to claim 1, wherein:
   a) the polymer layer is situated on an outer side of the jacket and is drawn radially inwardly in a continuation on the outer side of the end wall, and ends in a circular sealing lip.

3. The support or drive roller according to claim 2, wherein:
   a) the sealing lip is in one piece with the polymer layer.

4. The support or drive roller according to claim 2, wherein:
   a) the sealing lip is provided on the polymer layer.

5. The support or drive roller according to claim 1, wherein:
   a) the outer hub and the inner hub are integrally joined.

6. The support or drive roller according to claim 1, wherein:
   a) the outer hub and the inner hub are positively fit together.

7. The support or drive roller according to claim 1, wherein:
   a) the outer hub and the inner hub are joined together, the outer hub being on the inner hub.

8. The support or drive roller according to claim 1, wherein:
   a) the outer hub and the inner hub are made of a polymer.

9. The support or drive roller according to claim 1, wherein:
   a) the outer hub and the inner hub are made of a polyamide.

* * * * *